March 29, 1966     A. A. SALAS     3,242,574
RULING DEVICE
Filed Sept. 9, 1963
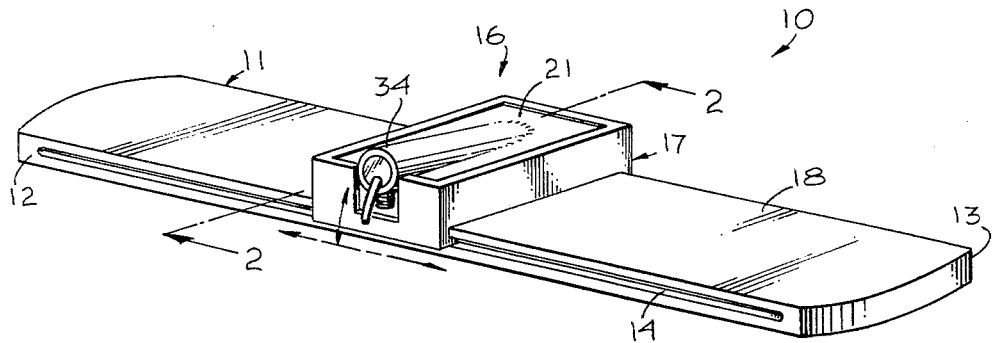
*Fig. 1*
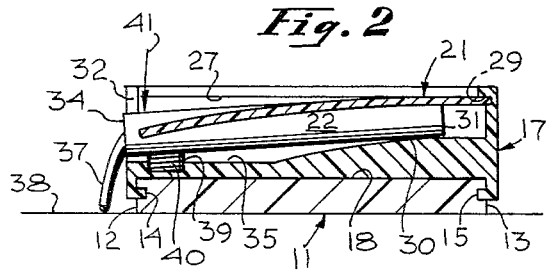
*Fig. 2*
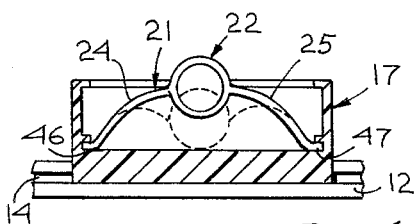
*Fig. 4*
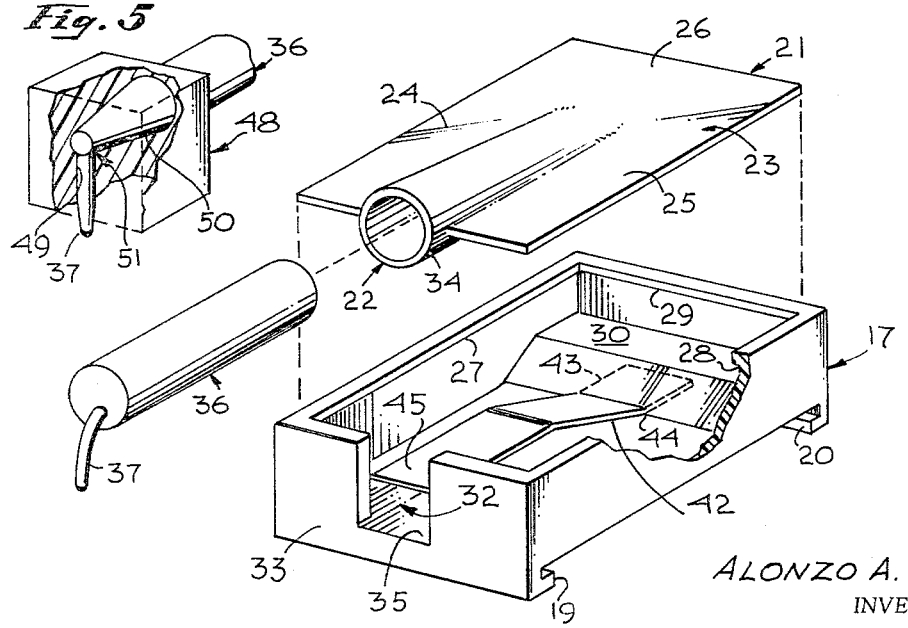
*Fig. 5*
*Fig. 3*
ALONZO A. SALAS
INVENTOR.
BY Allan M. Shapiro
ATTORNEY

United States Patent Office 3,242,574
Patented Mar. 29, 1966

3,242,574
RULING DEVICE
Alonzo A. Salas, 11723½ Moorpark St.,
Los Angeles, Calif.
Filed Sept. 9, 1963, Ser. No. 307,467
6 Claims. (Cl. 33—32)

The present invention relates to ruling devices and, more particularly, to a device generally comprising a ruler carrying a reciprocable marking instrument.

The principal object of the present invention is to provide a ruler with a reciprocable marking instrument that can be placed on a page of a book for ready availability to the reader of the book for use in underlining any selected portion of the printed material.

Another object of the present invention is to provide a ruler with a reciprocable marking instrument operable in such a manner that either the entire device or just the marking instrument portion can be moved in location while disposed on a surface to be marked without causing marking thereof and, by simple manual operation, can cause ruled marking of deisred portions upon such surface.

In accordance with the present invention, there is provided a ruler, which may be of the ordinary flat rectangular type, having a marking instrument disposed on the top surface of the ruler and in longitudinally slidable engagement therewith. The marking instrument portion generally comprises a housing in which is mounted cartridge means containing a marking material, such as ink, the cartridge means having a marking point portion extending outwardly beyond the front of the housing and adapted for contact with the paper surface for marking thereon. Spring means are provided for biasing the cartridge means in an upward direction for normally maintaining the marking point out of contact with the paper, and the cartridge means is manually depressable for causing selected contact of the marking point with the paper during simultaneous reciprocable longitudinal movement of the marking instrument with respect to the ruler.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of a ruling device in accordance with the present invention;

FIGURE 2 is a sectional side view, partly in elevation as seen along line 2—2 in FIGURE 1;

FIGURE 3 is an enlarged, exploded, perspective view of the marking instrument portion in accordance with the present invention;

FIGURE 4 is a fragmentary front elevation view, partly in section, showing another embodiment of the marking instrument portion in accordance with the present invention; and FIGURE 5 is an enlarged, fragmentary, perspective view, partly broken away, of another embodiment of the head of the marking instrument portion in accordance with the present invention.

Referring to the drawings, in which the same reference numerals refer to the same or similar elements in the various views, there is seen a ruler member 10 which consists of a substantially flat rectangular rigid body member 11 having parallel longitudinal edges 12 and 13 provided with respective longitudinal grooves 14 and 15.

The marking instrument portion, indicated generally at 16, comprises a substantially rectanguloid housing 17 adapted to fit and slide upon the upper surface 18 of the ruler body member 11 and having a pair of opposing parallel tongues 19 and 20 which are snapped into and slidably fit within the respective grooves 14 and 15 on the ruler edges 12 and 13, thereby causing the marking instrument portion 16 to be retained by the ruler member 10 and guided for reciprocable motion along the length thereof.

Disposed within the instrument housing 17 is a cartridge holder 21 composed of a flexible resilient material such as, for example, polyethylene or similar plastics, and comprising a tube portion 22 integrally provided with a flat portion 23 extending substantially radially outwardly from the tube portion 22 in opposite directions therefrom as well as rearwardly therefrom. The side portions 24 and 25 as well as the rearward portion 26 of the flat portion 23 are disposed under respective flanges 27, 28 and 29 of the housing 17 in abutting relationship therewith for retention within the housing 17. The housing 17 has an internal rearward raised surface 30 upon which rests the rearward end 31 of the tube 22 for generally pivotal movement in the vertical direction. The housing 17 is open at its top and provided with an upwardly open rectangular slot 32 at its front end 33. The open top of the housing 17 provides access for both assembly and operation of the device, and the slot 32 freely accommodates the front end portion 34 of the tube 22 for vertical movement thereof. The internal frontward bottom surface 35 of the housing 17 is lower that the rearward surface 30 to permit such vertically pivotal movement of the tube 22, as when it is depressed in operation as will be described hereinafter.

Disposed within the tube 22 in press-fit engagement is a replaceable cartridge 36 which contains ink or any other suitable marking material. A marking point 37, or other suitable conduit for the transmission and release of the contents of the cartridge 36, projects from the cartridge 36 and is arranged to form an appropriate angle with the surface of the paper 38 or other material to be marked, as best seen in FIGURE 2.

In the embodiment as illustrated in FIGURES 1 and 2, the inner forward bottom surface 35 of the housing 17 is provided with a cylindrical depression 39 for receiving one end of a coil spring 40, the other end of which is under and abuts against the forward end portion 34 of the tube 22 for normally maintaining the tube 22 in its upper position (FIGURE 1). In FIGURE 2, the tube 22 has been manually depressed at the approximate location and in the direction indicated by the arrow 41, thus causing the spring 40 to be compressed and permitting the marking point 37 to contact the surface 38 to be marked.

In FIGURE 3, a modification of the means for normally maintaining the tube 22 in its upper position is seen to comprise a leaf spring 42 which is wider than the slot 32 and has its rearward end 43 inserted into a slot 44 in the rearward surface portion 30 of the housing 17 and its forward end 45 raised above the inner forward surface 35 of the housing 17 and located under the forward portion 34 of the tube 22 to provide a spring action similar to that of the coil spring 40.

In FIGURE 4, there is seen another modification of the means for normally maintaining the tube 22 in its upper position wherein the flat side portions 24 and 25 of the cartridge holder 21 are wider than the housing 17 so that, when the cartridge holder 21 is inserted into the housing 17 during assembly, the side portions 24 and 25 are flexed. The housing 17 is provided with a pair of internal channels 46 and 47 into which the respective edges of the side portions 24 and 25 are inserted and secured so that such flexing causes the cartridge holder 21 to assume the upwardly convex attitude illustrated in solid lines. Upon manual depression of the forward end of the tube 22, as aforesaid, the cartridge holder 21 assumes the position and form illustrated in dash lines. Because of the resiliency of the material of which the cartridge holder 21 is composed, it will return to its original raised position upon release of the manual pressure. Thus, in this embodiment, the side portions 24 and 25 function effectively as leaf springs by themselves, hence eliminating the need for auxiliary springs 40 or 42 for the return spring action.

In FIGURE 5 there is seen a modification of the marking portion of the instrument wherein there is provided a molded block 48 having two apertures 49 and 50 therein communicating with each other at approximately a right angle. The vertically oriented aperture 49 contains the marking point 37 in press-fit engagement and communicates at the junction area 51 with the apex of the substantially conical and horizontally oriented other aperture 50, into the other end of which is secured the forward end of the cartridge 36.

Although it is believed that the operation of the device is now clear, an example will be given of one application in which the operator is reading a book, such as a textbook, and desires to underline key words or other more extensive portions of the printed material for ease in later reference and/or review and as an aid to mental retention of the essence of the textual material. The reader places the device upon the page of the book in parallel with the printed lines and, as he reads, either moves the entire device downwardly upon the page, line by line, or else maintains the entire device in a conveniently available position, as desired. The first of the above alternative methods is preferred because of the concomitant rapidity with which the device can be used for marking. By the use of a single finger to merely depress the forward end 34 of the cartridge holder 21 at the location 41 and, simultaneously, apply a lateral force with the same finger to cause the entire marking instrument portion 16 to slide longitudinally along the ruler 11, the reader causes a straight line to be marked under the word or series of words desired. Because of the extreme rapidity of the operation and the lightness of the force required to be applied, a desirably minimal distraction of the reader occurs, and his reading and thought processes can continue at an unabated and uninterrupted pace.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A ruling device comprising:
a ruler member;
a marking instrument housing disposed in slidable engagement with said ruler member on top thereof and having a top opening defined by internally peripheral flanges;
cartridge means containing a marking material and having a marking point adapted to contact a surface to be marked and deposit such marking material thereon:
cartridge holder means mounted in said housing in vertically movable retained engagement therewith and comprising a tube portion integrally provided with flat portions extending laterally therefrom, said tube portion holding said cartridge means, said flat portions abutting under said housing flanges; and
spring means for normally maintaining said cartridge means and cartridge holder means in an upper position whereby said marking point is normally maintained out of contact with the surface to be marked, said cartridge means and cartridge holder means being manually depressable for selective marking contact of said marking point with the surface to be marked.

2. A ruling device comprising:
a ruler member;
a marking instrument housing disposed in slidable engagement with said ruler member on top thereof and having internally peripheral flanges defining a top opening;
cartridge means containing a marking material and having a marking point adapted to contact a surface to be marked and deposit such marking material thereon:
cartridge holder means mounted in said housing and comprising a tube portion integrally provided with flat portions extending laterally therefrom, said tube portion holding said cartridge means, said flat portions abutting under said housing flanges, the rearward end of said cartridge holder means being pivotally mounted whereby the forward end thereof is vertically pivotable; and
spring means for normally maintaining said cartridge holder means in an upper position whereby said marking point is normally maintained out of contact with the surface to be marked, the forward end of said cartridge holder means being manually depressable for selective marking contact of said marking point with the surface to be marked.

3. A ruling device in accordance with claim 2 wherein:
said spring means comprises a coil spring disposed in compressed abutment between the forward end of said cartridge holder means and said housing.

4. A ruling device in accordance with claim 2 wherein:
said spring means comprises a leaf spring having one end secured to said housing and the other end in upwardly forcing engagement with the forward end of said cartridge holder means.

5. A ruling device comprising:
a ruler member;
a marking instrument housing disposed in slidable engagement with said ruler member on top thereof and having internally peripheral flanges defining a top opening, said housing having an internal rearward raised surface;
cartridge means containing a marking material and having a marking point adapted to contact a surface to be marked and deposit such marking material thereon;
cartridge holder means mounted in said housing and comprising a tube portion integrally provided with flat portions extending laterally therefrom, said tube portion holding said cartridge means, said flat portions abutting under said housing flanges, the rearward end of said cartridge holder means resting upon said raised surface of said housing whereby the forward end of said cartridge holder means is vertically pivotable; and
spring means for normally maintaining said cartridge holder means in an upper position whereby said marking point is normally maintained out of contact with the surface to be marked, the forward end of said cartridge holder means being manually depressable for selective marking contact of said marking point with the surface to be marked.

6. A ruling device comprising:
a ruler member;
a marking instrument housing disposed in slidable engagement with said ruler member on top thereof and having upstanding sides and an internal bottom surface defining a cavity, said housing being provided internally with a pair of opposing parallel channels on opposite sides of said cavity;
cartridge means containing a marking material and having a marking point adapted to contact a surface to be marked and deposit such marking material thereon; and cartridge holder means comprising a tube portion integrally provided with resilient flat portions extending laterally therefrom, said tube portion holding said cartridge means, said cartridge holder means being wider than the distance between said parallel channels, the lateral respective edges of said flat portions being retained in said channels whereby said flat portions are flexed for normally maintaining said tube portion in an upper position, said tube portion being manually depressable for selective marking contact of said marking point with the surface to be marked.

References Cited by the Examiner

UNITED STATES PATENTS

| | | | |
|---|---|---|---|
| 372,319 | 11/1887 | Mather | 33—35 |
| 852,430 | 5/1907 | Goodman | 33—35 |

FOREIGN PATENTS

| | | |
|---|---|---|
| 888,102 | 8/1943 | France. |
| 300,629 | 10/1954 | Switzerland. |

ISAAC LISANN, *Primary Examiner.*